United States Patent [19]

Sugimoto

[11] 4,170,786
[45] Oct. 9, 1979

[54] CORRECTIVE METHOD OF REPRODUCING MAGNETIC MEMORY SIGNALS AND APPARATUS FOR CARRYING OUT THE SAME

[75] Inventor: Norihiko Sugimoto, Hitachi, Japan

[73] Assignee: Hitachi, Ltd., Japan

[21] Appl. No.: 888,466

[22] Filed: Mar. 20, 1978

[30] Foreign Application Priority Data

Mar. 25, 1977 [JP] Japan ................................. 52-32224

[51] Int. Cl.² ............................................... G11B 5/09
[52] U.S. Cl. ......................................... 360/40; 360/41; 360/51
[58] Field of Search ............................ 360/51, 40, 41; 340/146.1 F

[56] References Cited

U.S. PATENT DOCUMENTS

| | | | |
|---|---|---|---|
| 3,382,492 | 5/1968 | Santana | 360/51 |
| 3,879,753 | 4/1975 | Dunn | 360/51 |
| 4,037,257 | 7/1977 | Chari | 360/51 |
| 4,040,022 | 8/1977 | Takii | 360/51 |

Primary Examiner—Vincent P. Canney
Attorney, Agent, or Firm—Craig and Antonelli

[57] ABSTRACT

The disclosure is concerned with a method of and apparatus for magnetic information recorded on a magnetic recording medium such as a thin magnetic card by the NRZ-I method. The omission of a timing pulse signal is sensed through a detection of two successive timing pulse signals of the same direction of magnetic inversion. As the omission of the timing pulse signal is detected, the missing timing pulse signal is corrected and the data corresponding to the corrected timing pulse signal is temporarily memorized. The memorized data is corrected when an omission of the data signal is detected later.

10 Claims, 8 Drawing Figures

FIG. 4

CORRECTIVE METHOD OF REPRODUCING MAGNETIC MEMORY SIGNALS AND APPARATUS FOR CARRYING OUT THE SAME

BACKGROUND OF THE INVENTION

1. Field of the Invention

The present invention relates to a technique for reading out information recorded on magnetic recording mediums and, more particularly, to a method of and apparatus for reproducing digital information recorded on such magnetic cards as entrance tickets, passenger tickets and lodging tickets which are not used as frequently or as repeatedly as commutation passes, credit cards or other essentially permanent cards.

Usually, magnetic cards for repeated and frequent use such as credit cards are rigid or coated on both faces with protective layers of a transparent plastic sheet, or other necessary measures are taken to prevent accidental bending of the magnetic surfaces, so that the information recorded thereon is not destroyed. Therefore, in these magnetic cards, destruction of information or information reading errors due to bending or distortion of the cards is avoided.

However, entrance tickets, passenger tickets or the like are usually of a thin construction from an economic view point because they are thrown away after the use. Thus, although it is prohibited to bend these cards, bending often occurs, resulting in the reading out and reproduction of erroneous information due to the destruction of the recorded information. This largely hinders the automation of various equipment and does not promote a reduction in labor.

The present invention aims at making it possible to reproduce correct information, even in the above-mentioned cases, by adopting a suitable interpolation technique.

The method and apparatus in accordance with the invention is effective particularly for less expensive magnetic cards in which the destruction of recorded information is likely to occur during handling. However, the invention can be applied not only to magnetic cards but also to other recording mediums including magnetic tape in which destruction of recorded information may take place.

2. Description of the Prior Art

A parity check system has been conventionally used, wherein parity bits are provided as means for checking the omission of bits due to the breakage of a recording or a similar reason, in the reproduction of information of the kind described.

More particularly, numerals are represented by bits in memory devices, and check bits are provided such that the sum of the number of bits magnetized in a plus direction always assumes an odd number. Thus during a data transfer, a check is conducted as to whether a number is an odd number or not; data which is not indicative of an odd number is detected as an error. This technique is referred to as odd number parity check, and has been widely used.

Meanwhile, a magnetic recording system relying upon magnetic cards, a binary recording method referred to as an NRZ-I method (Non-return to Zero and Invert at one or zero) is usually adopted, in which a magnetic inversion is effected by one datum, while the other datum does not cause the magnetic inversion.

In this NRZ-I method, a timing signal for defining the reading time is recorded in synchronization with the data, in addition to the parity bits. Thus, when the timing signal is missing and hence not reproduced due to bending of the magnetic surface, the character of the bit cell is judged invalid, even if the data can be read out, because the timing signal is missing. This NRZ-I method is disclosed, for example, in an article entitled "Spectrum Analysis of Digital Magnetic Recording Waveforms" by Arnold L. Knoll, inserted in IEEE Transactions on Electronic Computers, Vol. EC-16, No. 6 (December 1967), particularly in Table 1 and FIG. 1, page 733.

Also, the technique for reading out the magnetic information is disclosed, for example, in the specification of U.S. Pat. No. 3,840,892 (Oct. 8, 1974; Yukitaka Hayashi) Entitled "Method and Device for Detecting Signals from Magnetic Memory".

The Hayashi invention is concerned with a technique for reading out information by the NRZ-I method, and makes it possible to logically correct read out failure attributable to the lowering of the signal level due to the interference of the read out waveforms. This technique makes the most of the NRZ-I method, and performs a logical correction when two positive or negative pulses are successively detected, upon deciding that a signal is lacking between the two successive pulses.

The present invention is similar to the Hayashi invention in that it is adapted to decide that there is a missing signal when two positive or negative pulses are detected successively, as will be detailed later.

However, the Hayashi invention is effective, as will be seen from time charts of FIGS. 5 and 6, only in such a case where the data to be read out is lacking but where the clock pulses are normally available.

In practice, however, there are cases where the clock pulses themselves are omitted. In such a case, no interpolation of data can be made by the technique of the Hayashi invention.

The recording density on magnetic cards is usually much lower than that of other magnetic recording mediums such as magnetic tapes. Thus, in the case of the reproduction from magnetic cards, the reproduction is adversely affected by the omission of signals including clock pulses, rather than by the interference of the waveforms.

Unfortunately, however, there has not yet been proposed an effective measure, for correctly reading out data when there is a missing clock pulse.

BRIEF SUMMARY OF THE INVENTION

It is a principal object of the invention to provide a novel method of and apparatus for reproducing signals, suitable for use in carrying out the NRZ-I method.

More specifically, it is an object of the invention to provide a novel method of reproducing signals in which data is read out through correction by a logical interpolation when signals to be read out are missing.

It is another object of the invention to provide a method of reproducing signals in which correct data is read out through a logical interpolation of the data even when data is missing because of a missing timing or clock pulse.

The characteristic feature of the invention resides in correcting the timing or clock pulses upon deciding that a timing or clock pulse between two positive or negative pulses is missing when two positive or negative pulses happen to be detected successively, i.e. one after another.

Another characteristic feature of the invention resides in that, when a missing data is detected after the lapse of several clock pulses from detection of the timing pulses, the data is correctly reproduced through a correction of the missing data.

Still another characteristic feature of the invention resides in that the omission of the timing pulse and the omission of the data to be read out are detected independently and, when omission of the data is detected after a detection of omission of the timing pulse, a data correction is made corresponding to the missing pulse, so that the corrected signals may be reproduced.

BRIEF DESCRIPTION OF THE DRAWINGS

FIG. 4 shows a time chart of signals at major parts of the construction of FIG. 3, for data $D_1$ as shown in FIG. 1 and FIG. 2.

DESCRIPTION OF THE PREFERRED EMBODIMENTS

Before turning to the detailed description of the preferred embodiment, the basis of the invention will be explained for a better understanding thereof.

Figure 1:
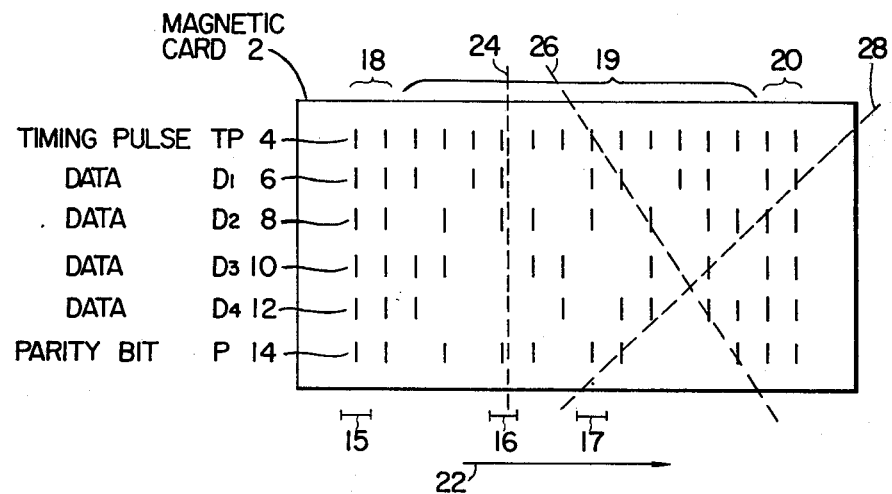
FIG. 1 is an illustration useful for explaining how the information recorded on an information card is affected by bending of the card.

Referring first to FIG. 1 showing an example of a magnetic card 2 having a magnetized surface, 6 pieces of information including data $D_1$ to $D_4$ (4,6,8,10,12) and parity bit 14, as well as a series of timing pulses 4 are recorded on the magnetized surface. The two bits 18 at the left-hand side end of the card constitute a start block for a magnetic inversion of all bits, thus representing the starting end of the magnetic card. A data block 19 shown at the central portion of the card accomodates the data to be reproduced. A pair of bits 20 provided at the right-hand side end of the card constitute an end block corresponding to the starting block 18. This end block also causes a magnetic conversion of all bits, so as to indicate the completion of the recording.

Although the data is composed of 4 bits in the illustrated example, this is not exclusive and the data can be composed of any number of bits other than 4. The start block 18 and the end block 20 are usually adapted to effect magnetic inversion of all of the timing pulses 4, data 6,8,10 and 12 and the parity bit 14.

In FIG. 1, the data block is shown to have 12 characters. However, the data block may have any number of characters other than 12.

In FIG. 1, bars represent a case in which there is a magnetic inversion, while blanks indicate no magnetic inversion.

Referring now to the bending of the card, it is possible for the card to be bent accidentally, such as along a vertical, transverse or oblique line, as shown, for example, by broken lines 24, 26 or 28. The line of bending 24 extends in the vertical direction, while lines 26 and 28 extend obliquely. Thus, a transverse line of bending has been omitted from the drawings.

As stated before, in the NRZ-I recording system, a magnetic inversion is made for each character, i.e. for each one bit cell 15, and the reading out of the data is performed each time the timing signal is reproduced. In other words, the data cannot be read out if the timing signal of the corresponding bit cell fails to be reproduced. Consequently, the data of bit sell 16 which lies across the line of bending 24 cannot be reproduced. In addition, the data of the bit cell 17, whose timing signal crosses the line of bending 26, cannot be reproduced.

Figure 2:
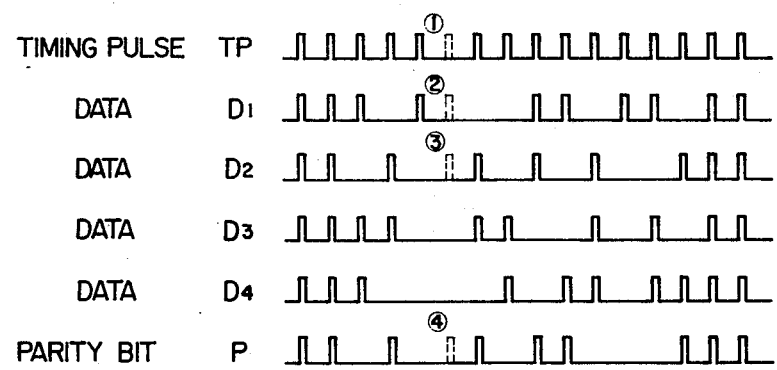
FIG. 2 shows a time chart of read out signals when the information of FIG. 1 is read out.

Referring now to FIG. 2 showing a time chart of the read out of information on the card 2 as shown in FIG. 1, pulses ① to ④ shown by broken lines cannot be reproduced if the card has been bent or folded along the line 24. Similarly, the data affected by the lines 26 or 28 cannot be reproduced. However, since the timing signals of bits other than the bit 17 are reproduced, the omission of the data can be known through a parity check. No problem is caused when the missing bit is "0" (zero), but the data is judged to be erroneous when the missing bit is "1".

The present invention aims at providing a method of and apparatus for reproducing correct signals even when there is a missing bit or bits, through interpolating and correcting the error. In FIG. 1, reference numeral 22 denotes an axis representing time.

A practical embodiment of the invention will now be described on the basis of these facts.

Figure 3:
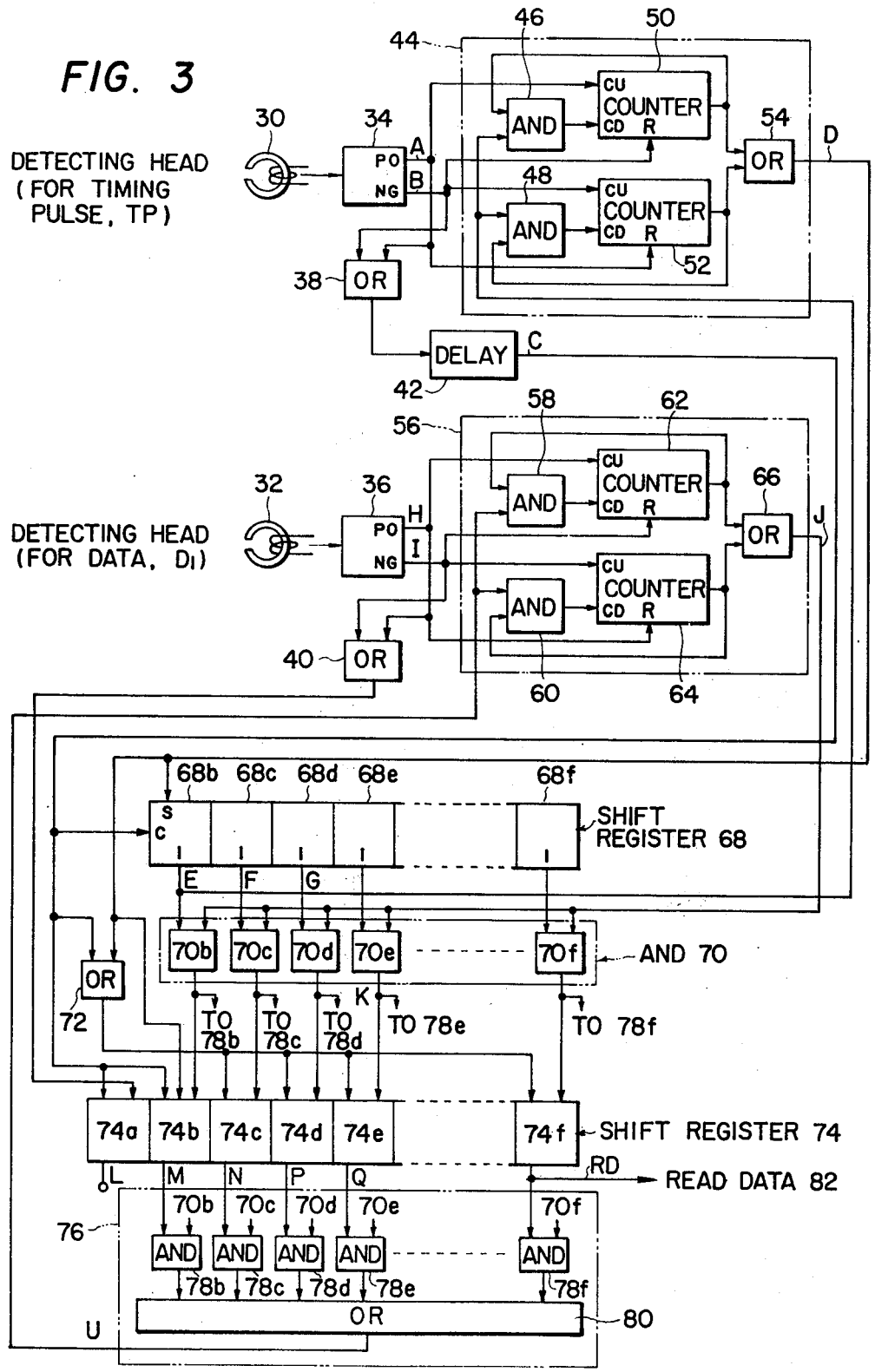
FIG. 3 shows the construction of a practical embodiment of the invention.

FIG. 3 shows the construction of a practical embodiment of the invention, exemplarily only for one bit including the parity bit. For a larger number of tracks, the number of the associated parts is increased corresponding to the number. More specifically, for treating the magnetic card shown in FIG. 1, the construction shown in FIG. 3 must have a combination of a pulse correction judgment circuits 44 and a shift register 68 for a timing pulse, four sets of a data-correcting pulse generating circuit 70 for data tracks $D_1$–$D_4$, a shift register 74 for data, and a circuit 76 for generating data-correction completion pulses for data tracks ($D_1$–$D_4$), and one set of the latter combination for parity signals.

To simplify the description, only the parts and circuits necessary for treating the timing signal and one data track are shown in FIG. 3.

Hereinafter, the relationship between the timing pulse TP and the data $D_1$ shown in FIGS. 1 and 2 will be described in relation to the construction shown in FIG. 3.

The signal detected by a detecting head 30 for the timing pulse is amplified and pulsed by a waveform shaping circuit 34 and is output from one of the output terminals PO and NG as a positive pulse A or a negative pulse B depending on whether the direction of magnetic inversion is positive or negative. Both of the output terminals of the shaping circuit 34 are connected to the input terminals of a timing pulse correction judgment circuit 44 and an OR circuit 38. The outputs from the OR circuit 38 are positive and negative timing pulses, and are input to the terminal C of a shift register 68 for the timing pulse, after a delay by a predetermined time for one bit cell effected by a delay circuit 42, so as to function as a clock for the shift register 68. The output from the OR circuit 38 is further input to the terminals C of the first and second shift registers 74a and 74b, so as to function as the clock signal of the shift register for data. This signal is transmitted further to the clock terminals C of the third and further shift registers 74c to 74f, through an OR circuit 72. Meanwhile, the output from the terminal D of the timing pulse correction judgment circuit 44 is input to a set terminals S of the first register 68b of the shift registers 68 for the timing pulse and to one of the input terminals of the OR circuit 72, and is further transmitted to a reset terminal R of the second register 74b of the shift registers 74 for data.

The timing pulse correction judgment circuit 44 is a circuit for judging whether two timing pulses of the same direction of magnetization have been detected or not, and is composed of AND circuits 46,48, counting circuits 50, 52 and an OR circuit 54. The counting circuit 50 is so arranged that an addition by "1" is made by a positive pulse A through an adding terminal CU, and a "0"-reset is effected through a reset terminal R by means of a negative pulse B. When two positive pulses A are input successively, the content of the counting circuit 50 becomes "2", the output is set, and a signal D is transmitted through the OR circuit 54 to the register 68b to set the latter. As the register 68b attains the set condition, the signal E attains the ON state, and a subtracting pulse having passed through the AND circuit 46 is input to the subtracting terminal CD of the counting circuit 50, so as to subtract "1" from the content of the counting circuit 50. On the other hand, the counting circuit 52 is so arranged that an addition by "1" is effected by a negative pulse B, while a resetting is effected by a positive pulse A. At the same time, when two negative pulses B are detected successively, the content of the counting circuit 52 becomes "2" and an output is set so as to set the register 68b to turn the signal E ON. Consequently, a subtracting pulse having passed through the AND circuit 48 is input to the terminal CD so as to effect subtraction by "1" from the content of the counting circuit 52.

The same circuit as that shown in the aforementioned specification of U.S. Pat. No. 3,840,892 can be used for judging whether the same magnetic inversion signals have been detected or not.

Hereinafter, a correction performed when there is the omission of a timing pulse will be described with reference to FIG. 4. It is assumed here that a pulse ① of negative pulses B read out from the wave form shaping circuit has been omitted. Since the pulse ① is not reproduced, the corresponding delayed pulse ⑤ of the timing pulse signal C cannot be reproduced. Pulses ① and ⑤ of the signals B and C are shown by broken lines. Since two positive signals A are detected successively, a pulse ⑦ is output as the output signal D from the correction judgment circuit 44. This signal functions to set the register 68b, so as to turn the signal E ON. The ON signal E is input to the terminal CD of the counter 52, so that the signal D (⑦) is reset.

In the shift registers 68, since the first register 68b has been set, the signals F,G ... of the output terminals of the second, third and further registers 68c, 68d ... are shifted at each input of the timing pulse, as illustrated, so as to memorize when the timing pulse has been omitted. Namely, the instant at which a timing pulse is omitted is successively shifted by the next timing pulse 6 and the subsequent pulses, by means of the timing pulse shift registers.

The output from the OR circuit 72 is used as the clock signal for the third and further data shift registers 74c, 74d ..., depending on the condition of the logical sum of the corrected timing pulse and the timing pulse having passed through the delay circuit 42.

The omission of the negative pulse ① causes, in addition to the omission of the pulse signals ② and ⑤, an omission of signal ⑨ of the output signal L from the data shift register 74a.

Concerning the condition signal M of the shift register 74b, a part ⑩ of the signal M has been omitted because of the generation of a correction timing pulse ⑦, although it should have been reset by the signal ⑥ of the signal C.

The operation further proceeds in the illustrated manner.

Only one set of circuits is necessary for performing the above stated function for the timing pulse.

Hereinafter, operation for the case of omission of data will be described with reference to FIG. 3. The number of circuit sets must correspond to the number of bits for this operation.

The pulse signal, which has been detected by a data detecting head 32 and then amplified and pulsed by the waveform shaping circuit 36, is output from one of the output terminals PO and NG of the shaping circuit 36 in the form of a positive pulse signal H and negative pulse signal I, depending on whether the magnetic inversion has been made in a positive or negative direction. Both of the two output terminals of the shaping circuit 36 are connected to the input terminals of counters 62,64 of a data correction judgment circuit 56, as well as to the input terminal of an OR circuit 40. The output from the OR circuit 40 bears data of both positive and negative directions, and is connected to the set terminal S of the first register 74a of the data shift registers 74, so that the register 74a is turned to the set condition at each arrival of data. The condition of this register is represented by the signal L as shown in FIG. 4. The output terminal of the data correction judgment circuit 56 is connected to a data correcting pulse generating circuit 70.

The data correction judgment circuit 56 has the same function as that of the foregoing timing pulse correction judgment circuit 44, and is constituted by AND circuits 58,60, counting circuits 62,64 and an OR circuit 66. This circuit performs the same operation as the timing pulse correction judging signal 44. More specifically, when data cannot be read out due to missing data or the non-reproduction of the timing pulse signal, the missing data is sensed through detection of two successive positive data pulses H or two successive negative data pulses I performed by the counting circuits 62 or 64. There is no output of a signal J from the data correction judgment circuit 56 when the positive and negative pulse signals H and I are read out alternatingly, since the counting circuits 62 and 64 are reset for each pair of positive and negative pulses.

The data correcting pulse generating circuit 70 is composed of AND circuits 70b to 70f supplied with signals from set output terminals of registers 68b to 68f of the timing shift registers 68, and the output signal J from the data correction judgment circuit 56. The output signal J from the data correction judgment circuit 56 is input to one of the input terminals of all AND circuits 70b to 70f.

The data correcting pulse generating circuit 70 decides to which register of the data shift registers 74 the failure of data read out due to the omission of a timing pulse corresponds when two data pulses of the same magnetizing direction are detected successively.

Namely, the instant at which the omission of a timing pulse has taken place is successively shifted by the timing shift registers, and the correction of the data is made at the instant that an AND operation on the timing signal and the signal representing the missing data performed.

The data shift registers 74 are composed of registers 74a to 74f of a number equal to that of the characters which are magnetically recorded. The first register 74a is adapted to be set at each arrival of a data pulse, and is reset at each arrival of a clock pulse. The second register 74b is adapted to be set by the output signal from the AND circuit 70b, and reset by the output signal D from the timing pulse correction judgment circuit 44. The second register 74b is further adapted to shift the register content of the previous stage upon receipt of the same clock as that for the register 74a. The third and further registers 74c to 74f are adapted to be operated by clock signals constituted by the same clock signal as that of the register 74a and the output signal D from the timing pulse correction judgment circuit 44. Further, a register carrying the data to be corrected is set by the output signal from the data correcting pulse generating circuit 70.

The subtracting signal U for performing a subtraction from the contents of counting circuits 62 and 64 of the data correction judgment circuit 56 is an output from a data correction completion pulse generating circuit 76 to which are supplied the output from the data correction judgment circuit 70 and the signal from set output terminal of the data shift register 74. The data correction completion pulse generating circuit 76 is constituted by AND circuits 78b to 78f and an OR circuit 80. The AND circuit 78b is adapted to receive the output signal from the AND circuit 70b and the setting output terminal signal M of the register 74b. Similarly, other AND circuits 78c to 78f are adapted to receive output signals from the AND circuits 70c to 70f and output signals from the registers 74c to 74f.

The outputs of all AND circuits 78b to 78f are connected to the input terminal of the OR circuit 80 whose output constitutes the output of the data correction completion pulse generating circuit 76 and is input to one of the input terminals of AND circuits 58 and 60.

The numbers of registers 68b to 68f of the timing pulse shift registers 74, the number of the AND circuits 70b to 70f of the data correction judging circuit 70 and the number of the AND circuits 78b to 78f of the data correction completion pulse generating circuit 76 are smaller by one than that of the registers 74a to 74f of the data shift register 74. This is because the omission of a timing signal is detected only after the reproduction of the next timing signal.

As a timing signal is omitted, the register 74b carrying the data of a preceding stage is reset by the detection of two successive timing signals of the same direction of magnetization. This reset condition is shifted by the data shift registers, until the magnetic inversion of the next data takes place. As an inversion of read data takes place, a judgment is effected to confirm whether the inversion is in the same direction as that of the magnetization of the data just before the omission of the timing signal. It is judged that there was a magnetic inversion of data at the time of the timing signal omission when the same direction is confirmed in the above stated process.

Thus, the timing pulse shift registers 68 judges which one of the registers is bound to carry the data corresponding to the missing timing signal, and turn the due register of the registers 74b to 74f to the set condition to correct the content to "1". Then, the data correction completion pulse generating circuit detects the correction, and subtracts "1" from the content of the counting circuits 62 or 64.

The corrected final read data 82 is then available at the set output terminal of the register 74f.

Hereinafter, the interpolation of the data will be described with reference to FIG. 4.

It is assumed here that the timing pulse ① is missing. In this case, the data pulse ② cannot be read out. The data pulse ② is a positive pulse H. Thus, two negative pulses I are read out successively, so that the output J is output from the data correction judgment circuit 56.

In this state, the register 68c of the timing pulse shift registers has attained the set condition (signal G of FIG. 4), and the correction of the data is made through a setting of the register 74d by a signal K via the AND circuit 70d.

Namely, the output signal from the register 74d (signal P in FIG. 4) performs the correction of the missing data. The hatched part of the signal P in FIG. 4 corresponds to the corrected data. The outputs from the registers 74d and 74d are denoted by P and Q, respectively. The read data RD is the output from the register 74f, and is represented by RD in the time chart of FIG. 4.

Figure 4:
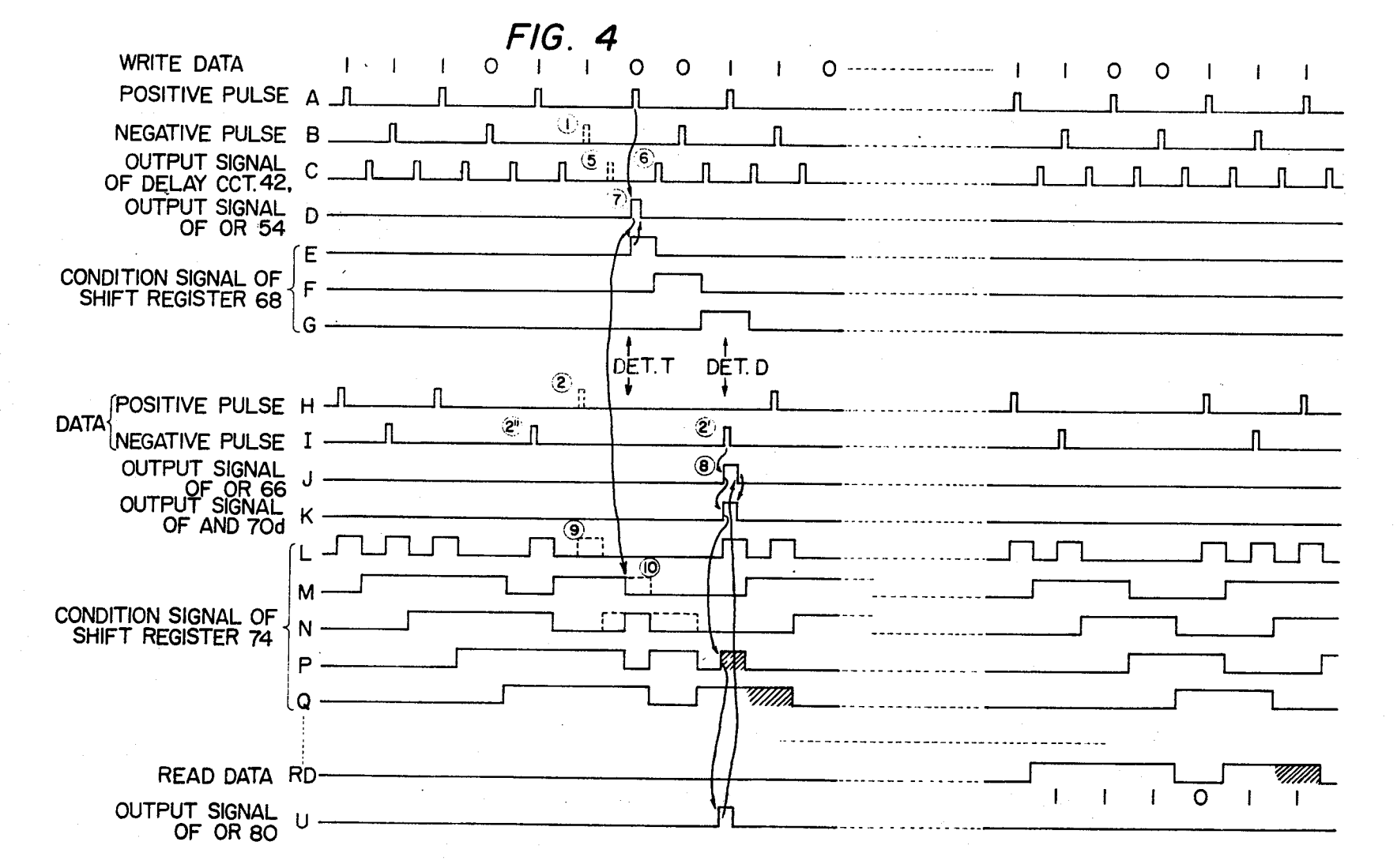

Assuming here that the correction of the missing data of the invention is not performed, the read data RD becomes [1,1,1,0,1,0], because the data corresponding to the hatched part of the signal P is FIG. 4 is left uncorrected.

It is to be noted here that when the omission of the timing pulse is detected at an instant det. T, and the omission of data is detected later, the correction is made exactly for the missing data. The detection of the missing of the data or the timing pulse is made, making use of the advantage of the NRZI method, through detection of two successive magnetic inversions in the same direction, as has been stated previously. More specifically, in case of data [1,1,1,0,1,1,0,0,1,1], the detection of the timing signal and the detection of the data signal are made at instants det.T and det.D of [1,1,1,0,1,1,det.T,0,-det.D,1]. The correction of the data signal even in this case can be made at the instant det.T, before the instant det.D. The det.D is an instant at which two data signals of the same magnetic inversion direction are detected successively. However, the omission of the data signal took place at an earlier instant. Thus, the correction is made as if retroactive to the earlier stage, because the timing pulse and the data signals are shifted by means of the shift registers.

Figure 5:
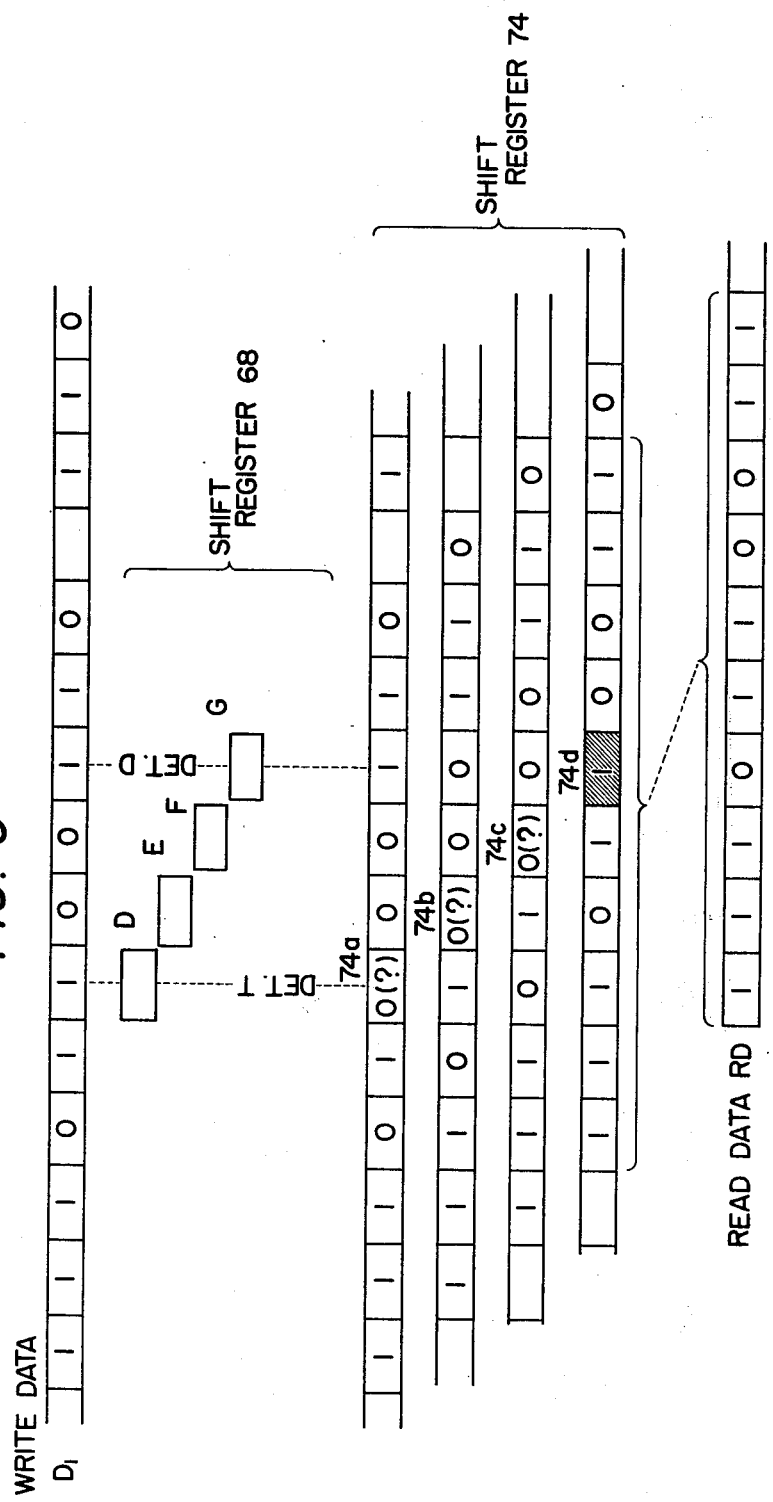
FIG. 5 is a schematic illustration of operation of the practical embodiment as shown in FIG. 3, for a better understanding of the operation of the embodiment and the time chart as shown in FIG. 4.

FIG. 5 schematically shows the above stated operation, in which the pattern of the data $D_1$ of FIG. 1 is exemplarily shown. As the omission of the timing pulse is detected at the instant det.T, this detection is successively shifted by the shift registers 68, so as to chase the correction point preparing for the subsequent detection of the omission of the data. Similarly, since there is the danger that the data corresponding to the missing timing pulse may not correct, the data signal is also successively shifted by the data shift registers, and the correction is made at the moment that it is detected that the omission of data has taken place at the instant det.T. Thus, if the omission of data is not detected after the instant det.T, it is considered that there was no omission at the instant det.T, or that the information is originally "0", and it is judged that there has been no omission of the data. For instance, concerning the line 24 of bending of FIG. 1, the information $D_3$ is originally "0" and therefore is not detected as being an omission of the data.

Turning again to FIG. 3, in a case where the data block is constituted by 12 characters as shown in FIG. 12, the correction for falling off of any bit is ensured if 12 registers 74a to 74f are prepared. However, for some bit constructions, the correction for all bits can be made by registers of a number much smaller than that of the characters. For instance, when the data are constructed such that a magnetic inversion is surely made within 4 successive bits, only four registers can ensure the correction for the dropping off of any bit, even if 12 characters are provided.

In the foregoing embodiment, the correction is made making use of the alternating inversion of timing signal.

However, the correction can be made making use of the fact that the timing signal is reproduced at a constant period, which fact is ensured by another fact that the time length of one bit cell at the time of writing is constant. Another embodiment of the invention based upon this theory will be described hereinafter.

For instance, in this embodiment, the time duration from detection of a timing signal to the detection of the next timing signal is set. When no timing pulse is detected within the set time duration, it is judged that there must be an omission of the next timing pulse, and a necessary measure is taken for correcting this missed timing signal.

However, it is pointed out that the time duration between the timing signals may have been changed and become not constant, by the environmental condition. More specifically, the time duration between the timing signals may have been changed due to the expansion or shrinkage of the magnetic surface attributable to the change of temperature and humidity, or due to a distortion of the magnetic surface.

In addition, this method of correction requires a detection of the speed of transfer or movement of the card, so as to correct the time duration until the next timing signal is detected in accordance with the change of the transfer or moving speed. Thus, the correction of the timing signal has to be made when the next signal is not detected in spite of an elapse of the corrected time duration.

Further, it is possible to arrange such that a certain allowance of time is imparted to the expected time duration until the reproduction of the next timing signal. Thus, the correction of the timing signal is made when the next timing signal is not detected in the modified time duration. In this case, the signal reproduced before this time duration expires is regarded as a noise and is not read out. It is of course possible to modify the time duration taking into account the change of the card transfer speed. This modification of embodiment will be described with reference to FIG. 6.

Figure 6:
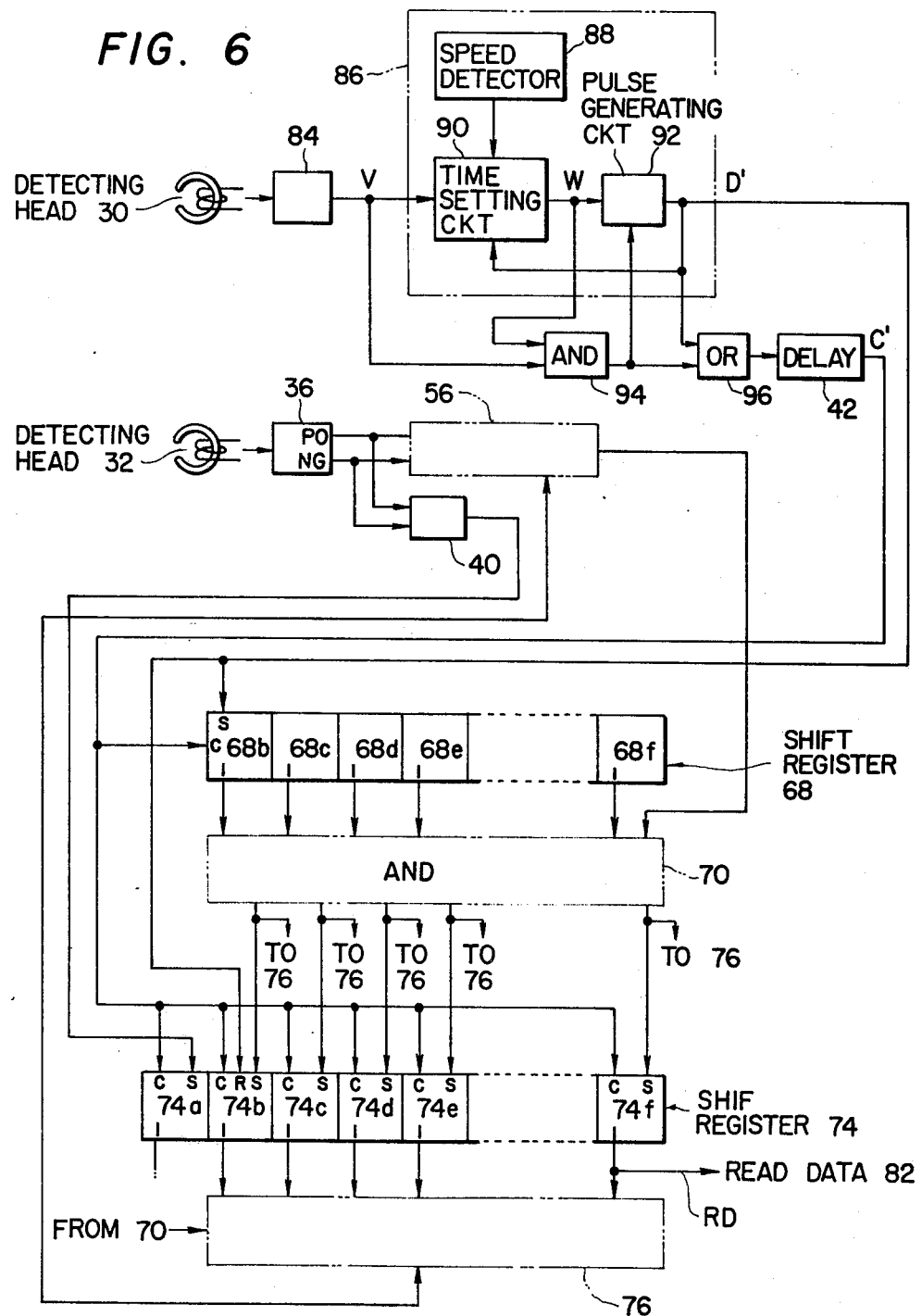
FIG. 6 shows a block diagram of detection of a missing timing signal through detecting failure of generation of a pulse.

In FIG. 6, parts of the same construction and function as those of FIG. 1 are denoted by the same reference numerals.

The output signal V read out by the timing pulse reading head 30 and then amplified and pulsed by the waveform shaping circuit 84 is input to a set time generating circuit 90 of a timing pulse correcting circuit 86, and to the input terminal of an AND circuit 94. In this embodiment, it is not necessary to detect the direction of the magnetic inversion of the timing pulse. The set time generating circuit 90 generates a pulse signal W of a width Tw after an elapse of a time T from the generation of an output pulse from the shaping circuit 84 or an output pulse from a later-mentioned pulse generating circuit 92, in accordance with the change of transfer of the card which is detected by a card transfer speed detecting circuit 88. The arrangement is such that the time length T and the pulse width Tw are made larger or longer as the card transfer speed becomes smaller, and shorter or smaller as the card transfer speed becomes larger.

The output of the set time generating circuit 90 is connected to the input terminal of the pulse generating circuit 92 and to the other input terminal of the AND circuit 94. The output terminal of the pulse generating circuit 92 is so connected that its output signal D' may be input to the input terminal of the aforementioned set time generating circuit 90, to the input terminal of the OR circuit 96, to the set terminal of the timing pulse shift registers 68 as is the case of the foregoing embodiment and to the reset terminal of the data shift registers 74.

Meanwhile, the output signal from the AND circuit 94 is input to the other input terminal of the pulse generating circuit 92 and to the other input terminal of the OR circuit 96. The output signal C from the OR circuit 96 is input to a delay circuit 42 which is same as that of the foregoing embodiment.

Thus, only the signal read out during the duration of the output pulse from the set time generating circuit 90 is judged to be the correct timing signal, and acts as the clock for the shift registers 68 and 74, via the AND circuit 94, OR circuit 96 and the delay circuit 42. If the timing signal is not reproduced due to omission, the AND circuit produces no output, and the pulse generating circuit 92 produces a correcting timing signal after the descending of the output pulse from the set time generating circuit 90. This correction of the timing pulse is stored in the timing pulse shift registers 68. Simultaneously, the registers of the data shift register 74 are reset. The corrected pulse signal then functions as the clock for the shift registers 68 and 74 and, in addition, to trigger the set time generating circuit 90 similarly to other safe clock pulses.

Figure 7:
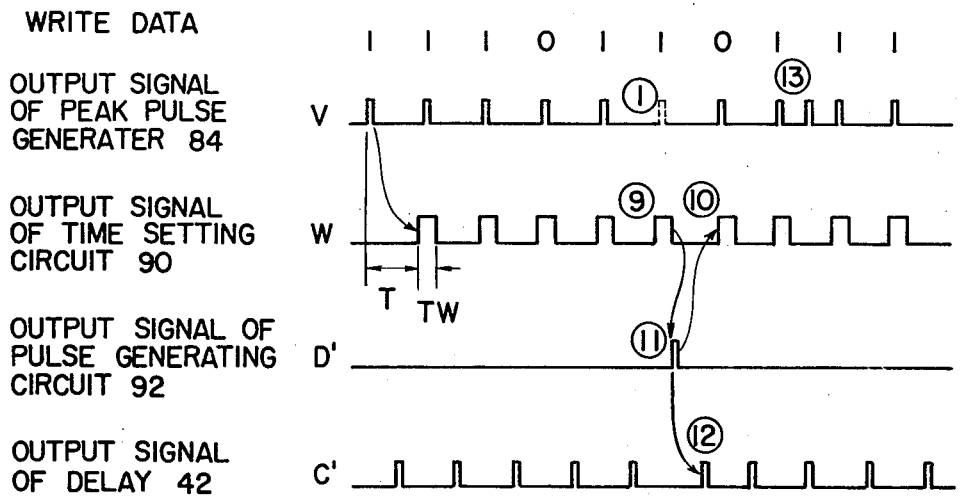
FIG. 7 is a time chart of the detection of a missing timing pulse as shown in FIG. 6.

The data shift registers 74 as shown in FIG. 6 differs from that in FIG. 3 in that all registers are driven by a common clock. This operation will be described with reference to FIG. 7.

Assuming here that the timing signal ① fails to be reproduced, the correcting pulse ⑪ is generated at the descending of the pulse signal ⑨, because the pulse of the timing signal ① is not detecting in the duration of the pulse ⑨, and the clock signal ⑫ for the next pulse ⑩ and for the shift registers is obtained.

In the modification now described, a signal ⑬ erroneously detected by noise before the elapse of a predetermined time can be judged as being a noise. Thus, the erroneous operation due to noises is conveniently eliminated. It will be seen that this modification has an enhanced stability against the noise, while preserving the same advantages as those of the foregoing embodiment.

In the embodiment, as shown in FIGS. 3, 4 and 5, the data are not read out but forcibly reset in case of a falling off of a timing pulse. For instance, the part denoted by "0(?)" in the schematic illustration of the shift register 74 in FIG. 5 is forcibly made "0" because of the falling off of the corresponding timing pulse, although the data itself is originally "1".

This arrangement is to effect the resetting to "0" forcibly, so as to exclude erroneous signals due to noises or the like, from a view point that the correct data must have been missed due to the omission of the timing pulse. It is also possible to read out and preserve the data signal at this instant, and then correct the data later at the time of omission of the data. However, such an arrangement requires a too complicated a circuit structure and, therefore, is not very practical. It is also possible to detect the coincidence of the data read out at the time of omission of a timing pulse with the corrected data, and to use the corrected data as the true data if they do not coincide with each other.

The corrected data obtained by the above described procedure are processed by a separate central data processor, after a demoudulation and a parity check.

Figure 8:
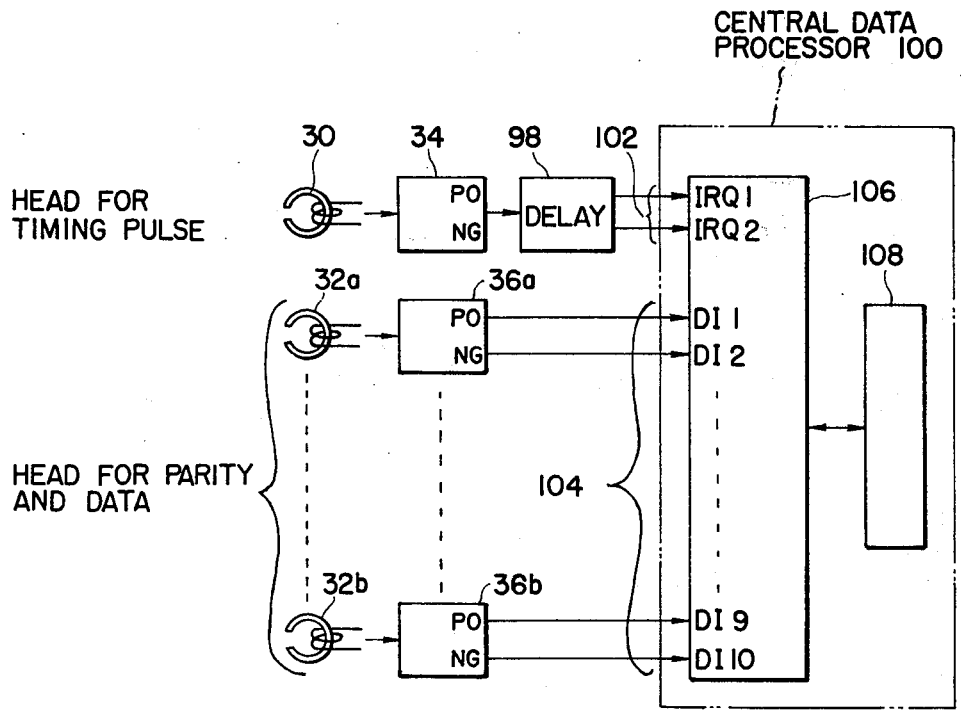
FIG. 8 schematically shows a construction for carrying out the invention by means of a central data processor.

As an alternative, a central data processor may be used to perform various functions stated before. This arrangement affords reducing the number of the constituents, while preserving the advantages of the foregoing embodiments. This embodiment will be described hereinafter with reference to FIG. 8 showing a construction incorporating a central processor for performing the same function as that of FIG. 3.

The pulse read out by the timing pulse reading head 30 and then amplified and shaped by the waveform shaping circuit 34, which may be a positive or a negative pulse depending on the direction of magnetization, is delayed by a delay circuit 98 until the read data is determined, and is then input to the interruption input terminals 1021RQ1, IRQ2 of an operation circuit 106 which constitutes a part of the central data processor 100. Meanwhile, the positive and negative pulses having passed through the data parity reading heads 32a to 32b (five heads are used in case of construction as shown in FIG. 1) and then amplified and shaped by wave form operating circuits 36a and 36b are input to each $DI_1$ to $DI_{10}$ of the data input terminals 104 of the operation circuit 106. At each time of receipt of the foregoing timing signal, an interruption demand is made on either one of the IRQ1 and IRQ2 of the interrupting input terminals 102, so that the data at the data input terminal 104 may be read into the operation circuit.

The central data processor 100 consists of the aforementioned operation circuit 106 and a memory circuit 108 adapted to store the result of the operation.

In the foregoing embodiments, the falling off to the data is sensed through a detection of a falling off of the timing signal. However, the invention can be further extended to include the following function.

For instance, it is considered that in some cases the data may have omitted although the corresponding timing signal is safe. In this connection, the aforementioned specification of Y. Hayashi's invention (U.S. Pat. No. 3,840,892) discloses how to treat the data when there is an omission of a data in successive three bits. The present invention can further extend the technique of above U.S. Patent such that the correction can be made even when the falling off of the data has taken place at an optional bit.

The falling off itself of the data can be detected, as mentioned before, by the detection of two successive magnetic inversions in the same direction. However, it has to be made clear to which timing pulse the missed data corresponds.

To this end, a judgment may be made by the parity bits. More specifically, when an omission of data is detected, a parity bit check is made by parity bits within the range at which the magnetic inversions in the same direction are detected, so as to specify the timing of falling off of the data. This measure is however invalid when there are two or more omissions of the dats in one magnetic card.

Having described several preferred embodiments of the invention, it is to be noted here that these embodiments are not exclusive but various modifications capable of correcting the data before the final reading through of the data, by suitably delaying the previously detected falling off of data by means of shift registers and the like.

What is claimed is:

1. A corrective method of reproducing magnetic memory signals for reading out and reproducing digital information recorded in a magnetic recording medium by an NRZ-I method, characterized by comprising the steps of detecting timing pulse signals comprised of magnetic inversion signals in positive and negative directions which are produced alternately, delaying said timing pulse signals by a predetermined delay time, applying the delayed timing pulse signals to a group of shift registers as the timing pulses for said shift registers, detecting, through a receipt of two successive timing signals of the same direction of magnetic inversion, a falling off of a timing pulse signal taking place between said two successive timing signals, producing a correcting timing pulse at an instant at which the succession of two timing pulse signals in the same direction of magnetic inversion takes place, memorizing the data corresponding to said correcting timing pulse in said shift registers, and correcting said data memorized in said shift registers at an instant when a falling off of data is detected through detecting two successive read data signals in the same direction of magnetic inversion.

2. A corrective reproducing method as claimed in claim 1, characterized in that the data signal corresponding to said correcting timing signal is reset to "0" and memorized in said shift registers.

3. A corrective reproducing method as claimed in claim 1, characterized in that said correcting timing pulse signal and the data signal at the correcting time are shifted in synchronization with each other.

4. A corrective reproducing method as claimed in claim 1, characterized in that, in detecting the falling off of a timing pulse, a time duration from generation of a timing pulse to the generation of the next timing pulse is previously set, and the detection of omission of the timing pulse is made through confirming that the next pulse is not sensed after the elapse of said time duration.

5. A corrective reproducing method as claimed in claim 4, characterized in that said correcting pulse signal is generated immediately after the confirmation of no pulse detected in said predetermined time duration.

6. A corrective reproducing apparatus for reading out information memorized in a magnetic recording medium by an NRZ-I method, characterized by comprising a head for detecting time pulse signals, a head for detecting data signals, a counter adapted to sense, when said head detects two successive timing pulse signals of positive or negative direction of magnetic inversion, that there must be a falling off of a timing pulse signal between said two successive timing pulse signals, a timing pulse shift register adapted to receive the output from said counter for sensing the omission of said timing pulse signal and to shift it successively upon receipt of subsequent timing pulse signals, a timing pulse shift register adapted to memorize and successively shift the data signal corresponding to the falling off signal detected by said counter, and a counter adapted to produce an output signal when two successive data signals of positive or negative direction of magnetic inversion are detected by said head for detecting data signals, whereby the data corresponding to said correcting data are corrected, after detection of the omission of said timing pulse signal, by said signal representative of the detection of the falling off of said data signal.

7. A corrective reproducing apparatus as claimed in claim 6, characterized by corresponding the number of bits of the data signal shift registers to the number of the characters of said magnetically recorded information.

8. A corrective reproducing apparatus as claimed in claim 7, characterized by comprising timing pulse shift registers with the number of bits being smaller by 1 (one) than that of the data signal shift registers.

9. A corrective reproducing apparatus as claimed in claim 6, characterized by comprising a delay circuit adapted to delay signals detected by said head for detecting timing pulse signals by a predetermined time and then applying the delayed signals to said timing pulse shift registers and to said data signal shift registers as the timing signals for these shift registers.

10. A corrective reproducing apparatus as claimed in claim 9, characterized by corresponding the number of logical summing circuits to that of the bits of said timing pulse shift registers, said logical summing circuits being adapted to correct the signals of corresponding bits of said data signal shift registers with logical sums of condition signal of said timing pulse signal shift registers and the output from said counter for detecting the omission of the data signal.

* * * * *